United States Patent Office 3,555,042
Patented Jan. 12, 1971

---

3,555,042
2,3,5,9b-TETRAHYDRO-1H-IMIDAZO[2,1-a]
ISOINDOL-5-OLS
Theodore S. Sulkowski, Wayne, Pa., assignor to American Home Products Corporation, New York, N.Y., a corporation of Delaware
Continuation-in-part of application Ser. No. 731,740, May 24, 1968. This application Oct. 4, 1968, Ser. No. 765,228
Int. Cl. C07d 49/34
U.S. Cl. 260—309.7    3 Claims

ABSTRACT OF THE DISCLOSURE

This invention concerns 2,3,5,9b-tetrahydro-1H-imidazo[2,1-a]isoindol-5-ols which are pharmacologically active as anorexiants and useful as intermediates. Further, it concerns the process for the preparation of these compounds.

---

Figure 1:
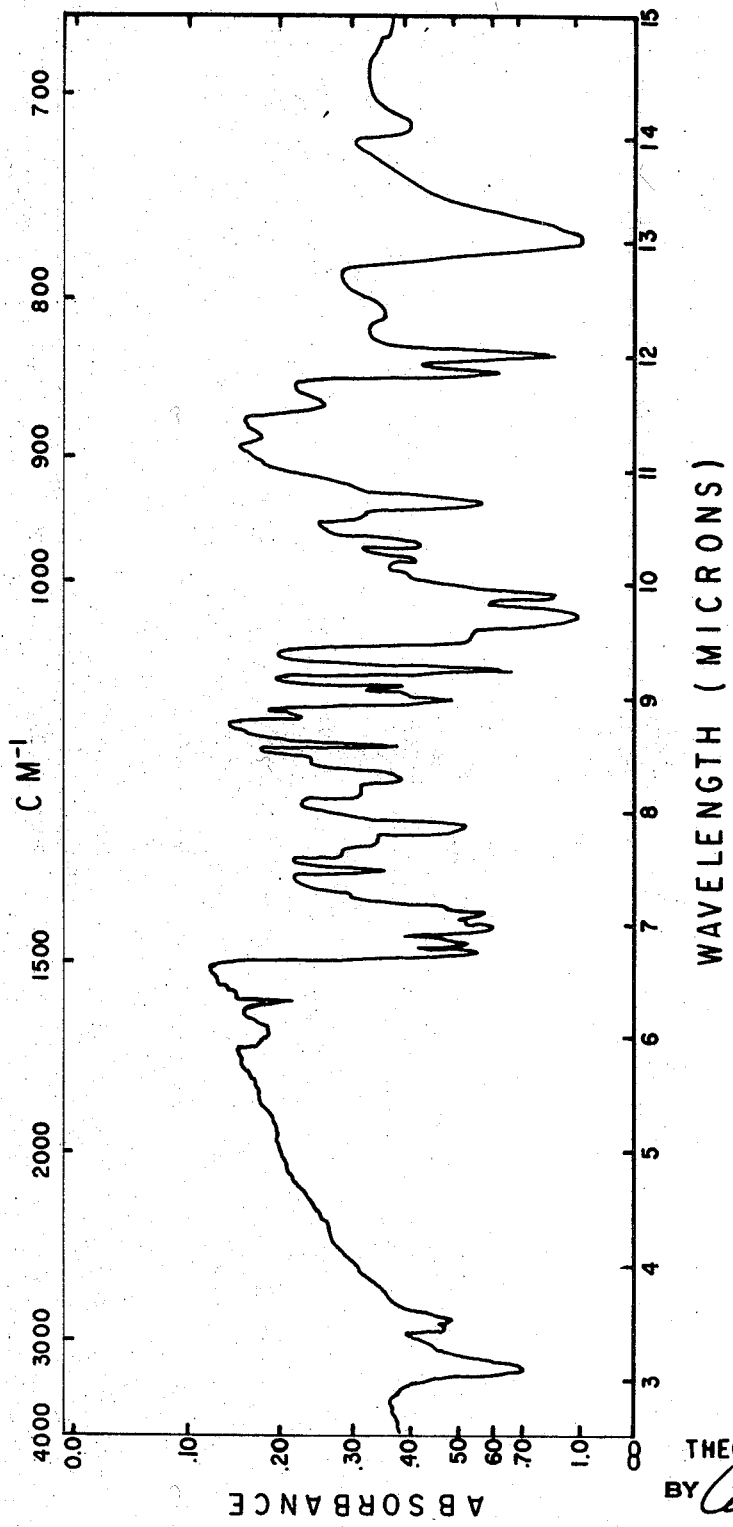

This is a continuation-in-part of U.S. patent application, Ser. No. 731,740, entitled "2,3,5,9b-Tetrahydro-1H-Imidazo[2,1-a]Isoindol-5-Ols" filed on May 24, 1968 by Theodore S. Sulkowski.

The present invention relates to new and novel imidazoisoindolols. More specifically, it concerns 2,3,5,9b-tetrahydro-1H-imidazo[2,1-a]isoindol - 5 - ols which in standard and accepted pharmacological tests have demonstrated anorexiant activity. Further, these compounds are useful intermediates in the preparation of pharmacologically active 2-(2-aminoethyl) isoindolines.

Representative examples of the new and novel compounds within the purview of the present invention are illustrated by the following structural formula:

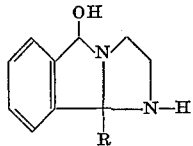

wherein R is selected from the group consisting of phenyl and chlorophenyl. Typical examples thereof are: 9b-(p-chlorophenyl) - 2,3,5,9b-tetrahydro-1H-imidazo[2,1a]isoindol-5-ol and 2,3,5,9b-tetrahydro-9b-phenyl-1H-imidazo [2,1-a] isoindol-5-ol.

The new and novel compounds of the present invention may be prepared by the process which is illustrated by the following reaction sequence:

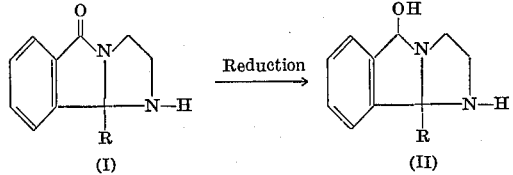

where R is defined as above. The above reduction is conducted by contacting an appropriate 1,2,3,9b-tetrahydro-5H-imidazo[2,1-a]isoindol-5-one (I) with from about one-half molar to about one molar equivalent of lithinum aluminum hydride in a reduction-inert, aprotic solvent at a temperature range from about 25° C. to about reflux temperatures for a period of about one-half to about twenty hours.

When the above reduction is complete, the resulting 2,3,5,9b-tetrahydro-1H-imidazo[2,1-a]isoindol-5-ol (II) is separated by conventional procedures. For example, the excess lithium aluminum hydride is decomposed by the addition of water. The reaction mixture is filtered and the collected solid is extracted with a water-immiscible organic solvent e.g. ethyl acetate, or chloroform, which extract is then evaporated until precipitation begins, when precipitation is completed the product (II) is separated by filtration.

It will be apparent to those skilled in the art that the aromatic ring which is part of the "indol" group and the phenyl group attached to the "9b" position of the starting 1,2,3,9b - tetrahydro-5H-imidazo[2,1-a]isoindol-5-one (I) can be variously substituted with groups that do not interfere with the process of the reaction, such as for example, but not limited thereto, halogen, alkoxy, hydroxy, trifluoromethyl, alkyl, amino and when the starting material (I) is so variously substituted, the resulting product (II) will be correspondingly substituted. Therefore, for the process of the invention, these variations are full equivalents of the process as particularly described and claimed.

Moreover, other groups can be employed in lieu of the 9b-phenyl group of the starting 1,2,3,9b-tetrahydro-5H-imidazo[2,1-a]isoindol-5-ones (I), such as for example, but without limitation thereto, phen(alkyl), alkyl, or a heterocyclic group, such as for example, thienyl and furyl. In the process of the invention such variations are also full equivalents of the process as particularly described.

The 1,2,3,9b - tetrahydro-5H-imidazo[2,1-a]isoindol-5-ones (I) employed as starting materials in the above reaction are prepared by the condensation of an orthobenzoylbenzoic acid or ester thereof with an ethylene diamine as described in copending U.S. patent application, Ser. No. 609,779 filed on Jan. 17, 1967 by Theodore S. Sulkowski and entitled "Benzodiazocines." As employed herein by the term "reaction-inert, aprotic solvent," is meant an organic solvent which neither yields a proton to the solute nor gains one from it and which neither react with the reactants nor interferes with their interaction. The time and temperature ranges given above are not critical and simply represent the most convenient ranges consistent with carrying out the reaction in a minimum of time without undue difficulty. Thus, reaction temperatures appreciably below these can be used, but their use considerably extends the reaction time. Similarly, reaction temperatures higher than those mentioned can be employed with a concomitant decrease in reaction time.

The new and novel 2,3,5,9b-tetrahydro-1H-imidazo [2,1-a]isoindol-5-ols of the present invention possess valuable pharmacological activity. In particular, these compounds in standard pharmacological procedures demonstrate activity as anorexiants in mammals. Because of this property they are of importance and useful in exerting an appetite suppressant effect.

In the pharmacological evaluation of the anorexiant compounds of this invention the in vivo effects of the compounds of this invention are tested as follows:

Male Charles River rats between 120 and 140 grams are trained to drink sweetened condensed milk from a graduated drinking tube. After a short learning period the animals are placed on a routine of water ad lib for twenty-four hours, standard laboratory chow for twentytwo hours and sweetened condensed milk for two hours. The volume of milk consumed is measured at one-half hour as well as two hours and the animals are weighed daily. This schedule is maintained five days a week over a period of several months. Trials are run on the same day each week and changes in milk consumed and twenty-four weight changes are compared to the average of the two days before the test compound is administered. Animals are tested as groups of six and one group is given saline each week to serve as controls. The test compounds are usually administered intraperitoneally in saline and/or orally in water.

The compounds of this invention in the above test procedure when administered orally to rats at a dose of 10 mg./kg. induce a decrease in food consumption of about fifty percent in the first half hour and about fifteen percent in two hours with a concurrent total average weight loss of about twenty-five grams in twenty-four hours. When administered intraperitoneally at a dose of 5 mg./kg., the compounds of this invention induce a decrease in food consumption of about eighty-five percent in the first half hour and about fifty-five percent in two hours with a concurrent total average weight loss of about fifteen grams. Further, when administered at a 10 mg./kg. intraperitoneal dose, the compounds of this invention induce a decrease in food consumption of about one hundred percent in the first half hour and about ninety percent in two hours with a twenty-four hour total average weight loss of about thirty grams per animal.

All variations on the 2,3,5,9b-tetrahydro-1H-imidazo[2,1-a]isoindol-5-ols (I) of this invention such as those hereinbefore described while affecting the degree of pharmacological activity, do not affect the kind of activity and, therefore, with respect to the kind of activity are full equivalents of the products as particularly described and claimed.

When the compounds of this invention are employed as anorexiants they may be administered to mammals, e.g. mice, rats, rabbits, dogs, cats, monkey, etc. alone or in combination with pharmacologically acceptable carriers, the proportion of which is determined by the solubility and chemical nature of the compound, chosen route of administration and standard biological practice. For example, they may be administered orally in the solid form containing such excipients as starch, milk sugar, certain types of clay and so forth. They may also be administered orally in the form of solutions or they may be injected parenterally. For parenteral administration they may be used in the form of a sterile solution containing other solutes, for examples, enough saline or glucose to make the solution isotonic.

The dosage of the present anorexiants will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects.

The new and novel 2,3,5,9b-tetrahydro-1H-imidazo[2,1-a]isoindol-5-ols of the present invention are also useful as intermediates in the ultimate preparation of their corresponding 2-(2-aminoethyl)isoindolines which have demonstrated pharmacological activity in standard biological tests as anorexiants and anti-depressants when administered to mammals e.g. mice, rats, rabbits, dogs, cats, monkeys etc. at a dosage range from about 0.1 mg. to about 10 mg. per kg. of body weight per day. These 2-(2-aminoethyl)isoindolines are described and claimed in copending U.S. patent application, Ser. No. 622,917, filed on Mar. 14, 1967, entitled "Isoindoles, Isoindolines and Related Compounds" by Theodore S. Sulkowski.

The 2,3,4,9b-tetrahydro-1H - imidazo[2,1 - a]isoindol-5-ols of the present invention may be converted to their corresponding 2-(2-aminoethyl)isoindolines by the process which is depicted by the following reaction sequence:

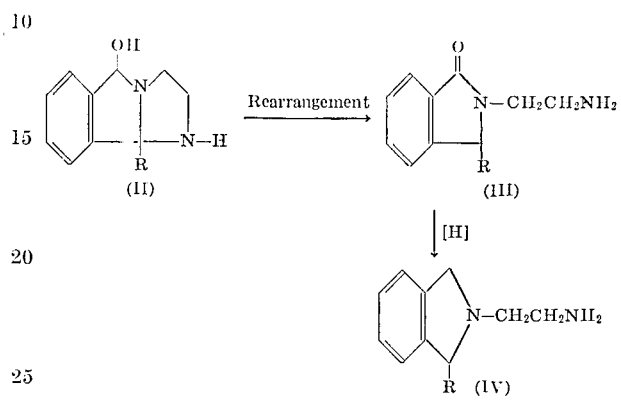

wherein R is defined as above. The rearrangement reaction is effected by suspending an appropritae 2,3,5,9b-tetrahydro - 1H-imidazo[2,1-a]isoindol-5-ol (II) in an alkanol e.g. ethanol which is solubilized by contact with hydrogen chloride and then immediately re-precipitates as the corresponding 2 - (2-aminoethyl)phthalimidine (III) hydrochloride.

Alternatively, the rearrangement reaction can be effected by refluxing an alkanolic mixture e.g. ethanol of an appropriate 2,3,5,9b-tetrahydro - 1H-imidazo[2,1-a]isoindol-5-ol (II) for a period of about a half hour. Thereafter, the reaction mixture is evaporated to dryness to afford a residue which is 2-(2-aminoethyl)phthalimidine (III).

The hydrogenation reaction is then effected as described in the above-identified U.S. patent application, Ser. No. 622,917. In general, this hydrogenation is conducted by contacting an above prepared 2-(2-aminoethyl)phthalimidine (III) with lithium aluminum hydride in an anhydrous, reaction-inert, organic solvent at a temperature from about 30° C. to about 80° C. for a period of from about one to about seventeen hours. Preferably, this reaction is conducted in anhydrous ether at the reflux temperature of the reaction mixture for a period of about two hours. By anhydrous, reaction-inert, organic solvent as employed herein is meant an anhydrous organic solvent which dissolves the reactants but does not react with them under the above described reaction conditions. Many such solvents will suggest themselves to those skilled in the art, in this regard, excellent results can be obtained with anhydrous solvents such as dioxan, ethyl ether, diisopropyl ether, ethylene glycol dimethyl ether and diethylene glycol dimethyl ether.

After the reaction is complete, the excess lithium aluminum hydride is decomposed by the addition of water, the organic layer is separated and the product (IV) obtained by conventional methods, such as concentration and crystallization. For example, the organic layer may be dried over a desiccant and then evaporated to dryness. The residue is the desired 2-(2-aminoethyl)isoindoline (IV). This product may then be dissolved in an appropriate organic solvent, such as, a lower alkanol, benzene, toluene, ethyl acetate, ether, chloroform, carbon tetrachloride or dimethyl formamide and reacted with a mineral acid to obtain the mineral acid addition salt of the particular 2-(2-aminoethyl)isoindoline (IV).

The following examples are given by way of illustration and are not to be construed as limitations of this invention, many variations of which are possible without departing from the scope and spirit thereof.

EXAMPLE I

Sixty grams of 9b-(p-chlorophenyl) - 1,2,3,9b-tetrahydro - 5H-imidazo[2,1-a]isoindol - 5-one are added in portions to a stirred suspension of 10 g. of lithium aluminum hydride in one liter of anhydrous ether. The mixture is stirred without heating for an additional one-half hour, then the remaining lithium aluminum hydride is decomposed by cautious dropwise addition of water. The solids are separated by filtration and then extracted with boiling ethyl acetate (2.0–2.5 liters total). The ethyl acetate extract is evaporated in vacuo until solid begins to precipitate. The mixture is chilled and the solid is separated by filtration. After air drying, there is obtained 20 g. of a white crystalline solid which is 9b-(p-chlorophenyl)-2,3,5,9b-tetrahydro - 1H-imidazo[2,1-a]isoindol-5-ol, M.P. 144–6° C. (dec.) when taken in a bath preheated to 130° C. The decomposition point is subject to variation depending on the manner in which it is taken.

Figure 2:
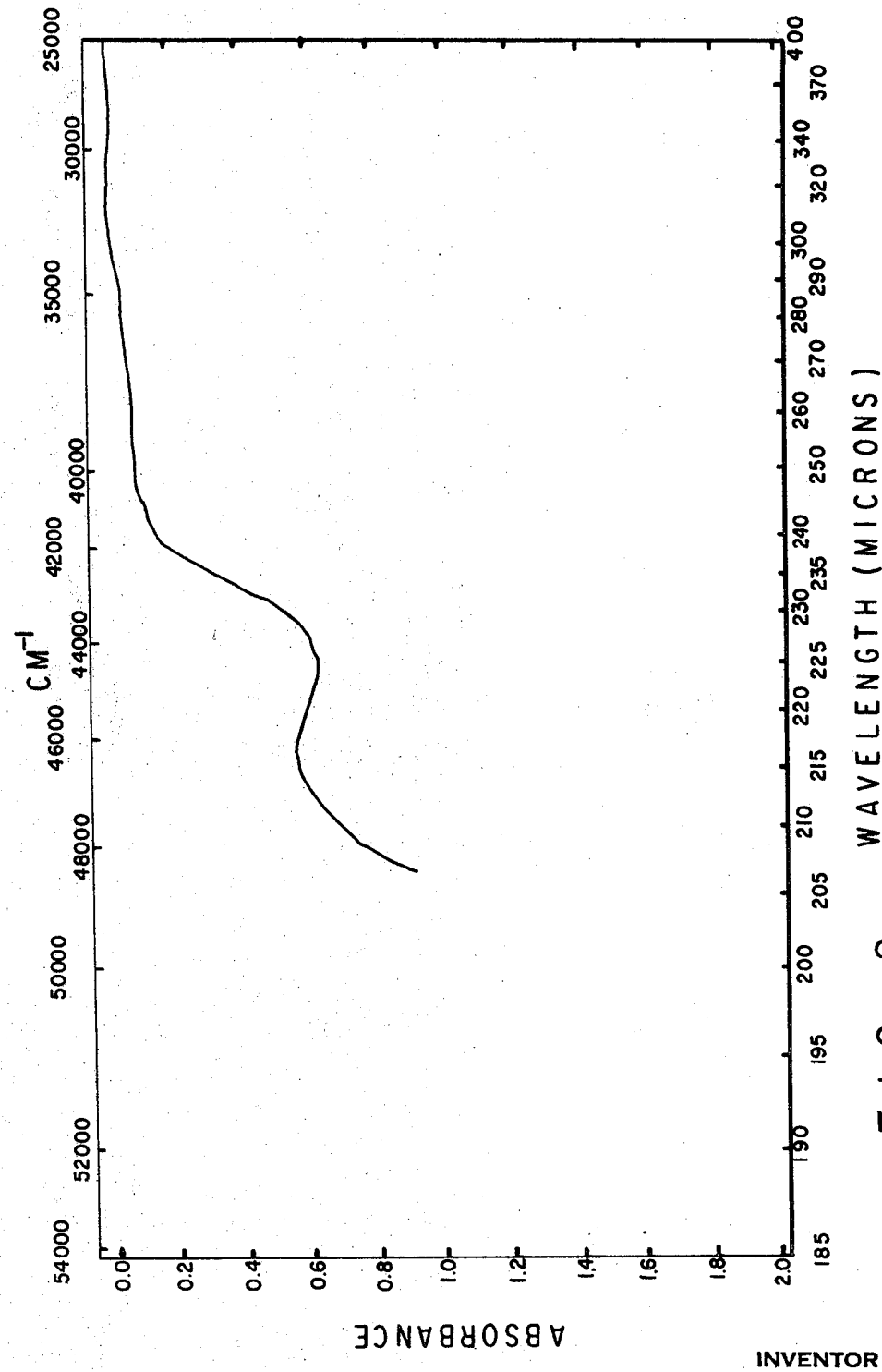
Figure 3:
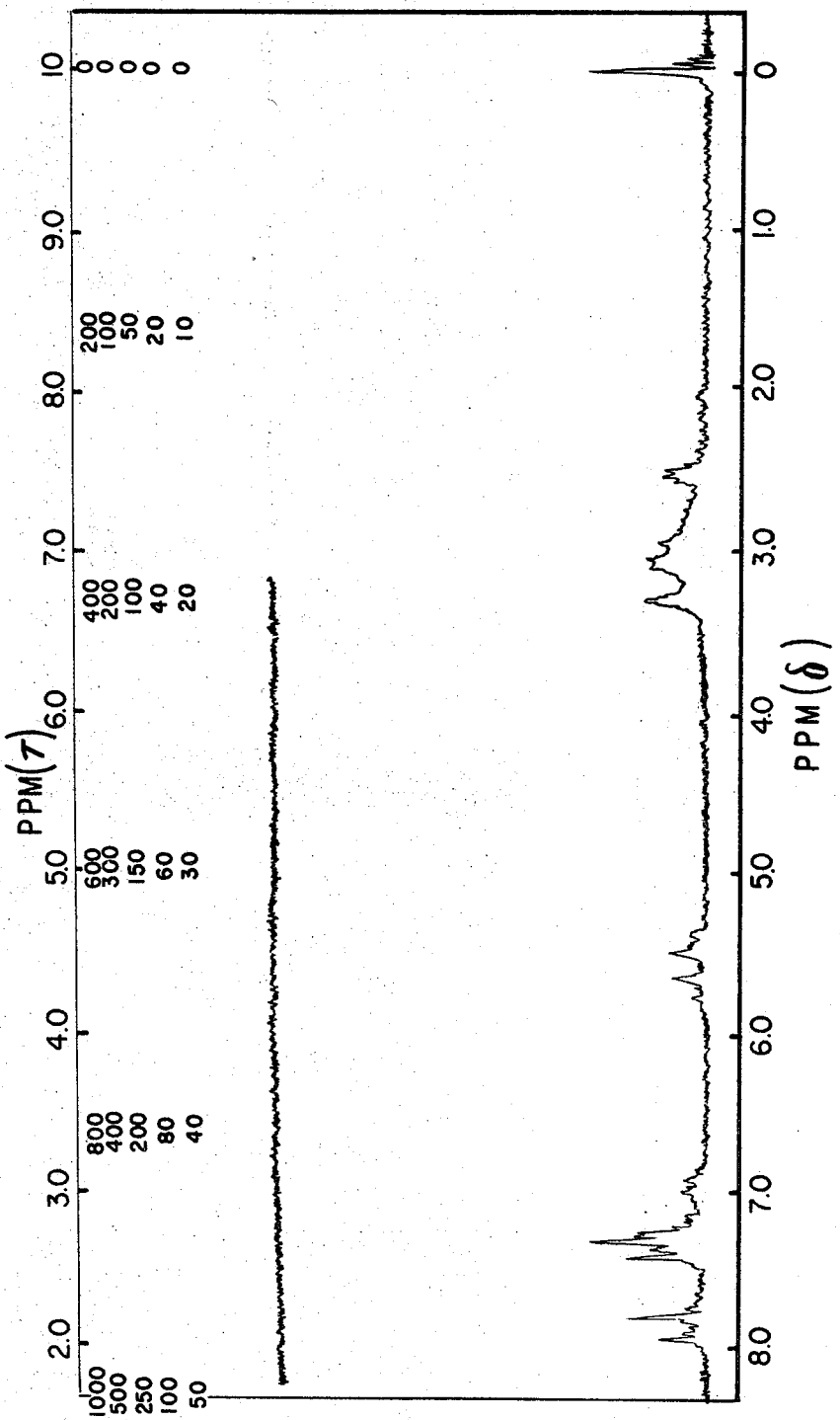
Figure 4:
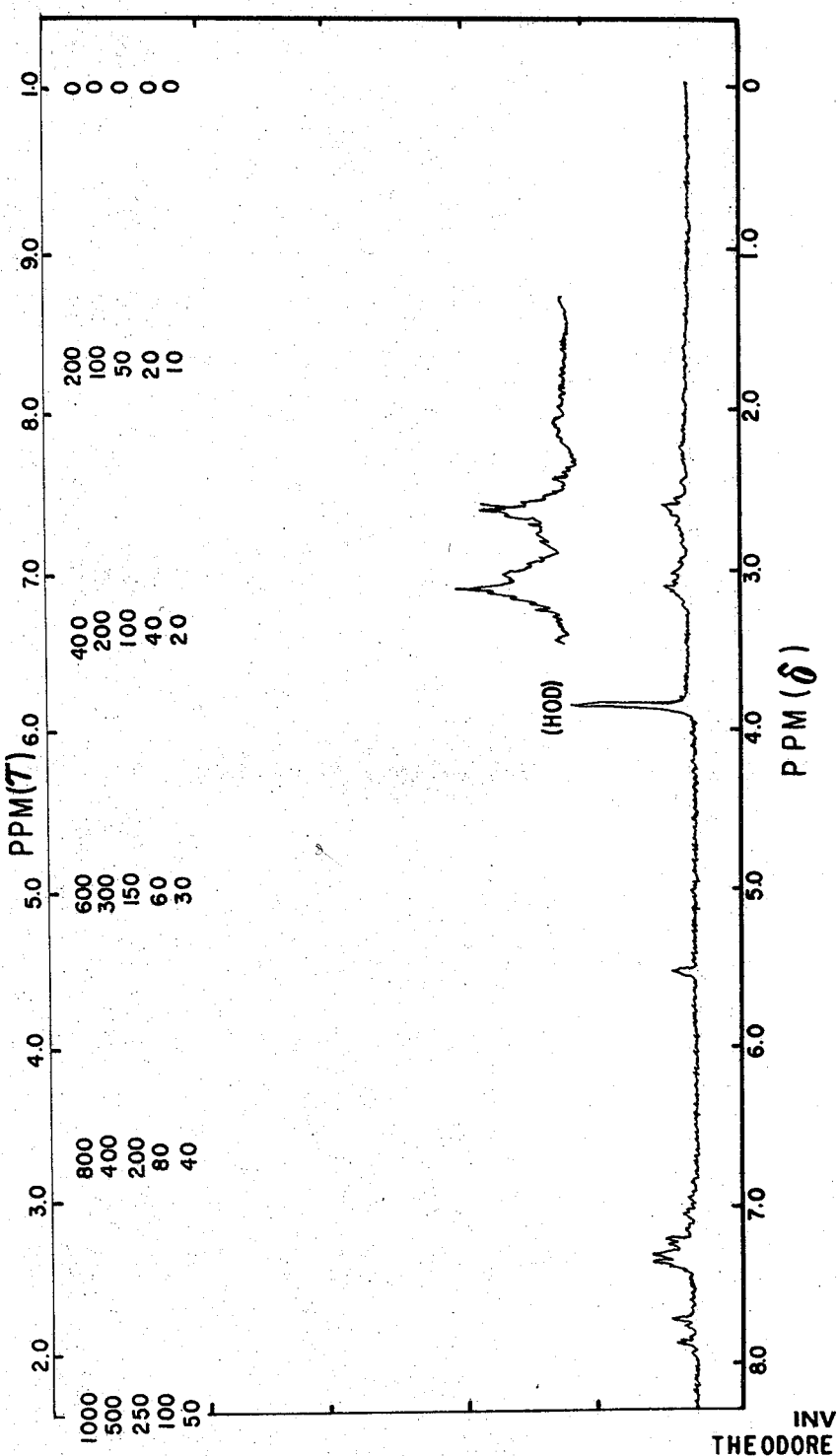

Analysis (I)—Exhibits an exotherm at 135° C. on a differential scanning calorimeter;

(II)—Infrared absorption (KBr), as shown in FIG. 1, at 3225 cm.$^{-1}$;

(III)—Ultra violet absorption (95% ETOH), as shown in FIG. 2, 224 m$\mu$ ($\epsilon$=19,400), 248 m$\mu$ ($\epsilon$=3,000)); 279 m$\mu$ ($\epsilon$=1,800) which is essentially that of the hereinafter described 2-(2-aminoethyl)-3-(p-chlorophenyl)phthalimidine hydrochloride;

(IV)—Nuclear magnetic resonance spectrum in deuterated dimethyl sulfoxide, as shown in FIG. 3, and the spectrum following deutrium oxide exchange, as shown in FIG. 4, for:

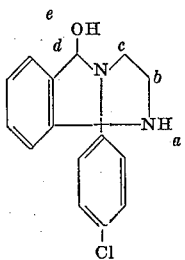

[1] 2.6–3.2 p.p.m. (two multiplets, 4 protons, at $b$ and $c$),
[2] 3.3 p.p.m. (broad singlet, 1 proton, at $a$ which disappears on deuteration),
[3] 5.6 p.p.m. (quartet, 2 protons, at $d$ and $e$, one proton disappears on deuteration and the quartet changes to a singlet at 5.6 p.p.m. at $d$), and
[4] 6.7–7.9 p.p.m. (multiplet, 8 aromatic protons; and (V)—Calcd. for $C_{16}H_{15}N_2ClO$ (percent): C, 67.03; H, 5.27; N, 9.77; Cl, 12.36. Found (percent): C, 67.08; H, 5.42; N, 9.86; Cl, 12.4.

EXAMPLE II

The 9b-(p-chlorophenyl) - 2,3,5,9b-tetrahydro-1H-imidazo[2,1-a]isoindol-5-ol (10 g.), as prepared in Example I is admixed with 75 ml. of ethanol and hydrogen chloride is bubbled through the mixture until precipitation ceases. Thereafter, the resulting product is separated by filtration and dried to afford a white crystalline solid which is 2-(2-aminoethyl)-3-(p-chlorophenyl)phthalimidine hydrochloride, M.P. 305–7° C. (dec.).

Aanalysis (I)—Infrared absorption (KBr) at 1690 cm.$^{-1}$;

(II)—Ultraviolet absorption (95% ETOH) 225 m$\mu$ ($\epsilon$=24,200), 248 m$\mu$ ($\epsilon$=5,700), 279 m$\mu$ ($\epsilon$=1,400); and (III)—Nuclear magnetic resonance spectrum in deuterated dimethyl sulfoxide for:

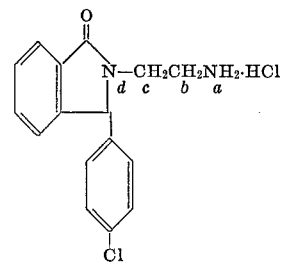

[1] 2.8–4.8 p.p.m. (two multiplets, 4 protons, at $b$ and $c$),
[2] 6.1 p.p.m. (singlet, 1 proton at $d$),
[3] 7.1–7.9 p.p.m. (multiplet, 8 aromatic protons), and
[4] 8.5 p.p.m. (broad singlet, 3 protons which disappears on deuteration, at $a$ and the hydrochloride).

The above-prepared 2-(2-aminoethyl)-3-(p-chlorophenyl) phthalimidine hydrochloride may then be converted to its corresponding base or to other acid addition salts by routine chemical procedures.

EXAMPLE III

The 9b - (p- - chlorophenyl) - 2,3,5,9b-tetrahydro-1H-imidazo[2,1-a] isoindol-5-ol (10 g.) as prepared in Example I, is refluxed in 75 ml. of ethanol for a half hour. Thereafter, the reaction mixture is evaporated to dryness to yield a non-crystalline residue which is 2-(2-aminoethyl)-3-(p-chlorophenyl)phthalimidine.

Analysis (I)—Infrared absorption (KBr) at 1675 cm.$^{-1}$; and (II)—Nuclear magnetic resonance spectrum in deuterated chloroform (CDCl$_3$) for:

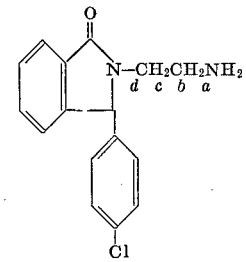

[1] 1.37 p.p.m. (singlet, 2 protons, which disappears on deuterated, at $a$),
[2] 2,6–4.1 p.p.m. (2 multiplets, 4 protons, at $b$ and $c$),
[3] 5.5 p.p.m. (singlet, 1 proton, at $d$), and
[4] 6.9–7.9 p.p.m. (multiplet, 8 aromatic protons).

The above-prepared 2-(2-aminoethyl)-3-(p-chlorophenyl)phthalimidine base can easily be converted to an appropriate acid addition salt by conventional procedures.

EXAMPLE IV

Six grams of the above-prepared 2-(2-aminoethyl)-3-(p-chlorophenyl)phthalimidine are added to a stirred suspension of 6 g. of lithium aluminum hydride in 250 ml. of anhydrous ether. The mixture is stirred and refluxed for fifteen hours. The mixture is decomposed by the careful addition of water. The ether layer is separated, dried over magnesium sulfate and evaporated to dryness. The residue is dissolved in absolute ethanol and saturated with hydrogen chloride. The solid is separated and recrystallized from alcohol. On drying there is obtained 2-(2-aminoethyl)-1-(4-chlorophenyl)isoindoline hydrochloride, M.P. 220–223° C.

Analysis.—Calcd. for $C_{16}H_{17}N_2Cl$ (percent): C, 62.15; H, 5.87; N, 9.06; Cl, 22.93. Found (percent): C, 61.76; H, 6.09; N, 9.44; Cl, 22.70.

EXAMPLE V

Sixty grams of 1,2,3,9b-tetrahydro-9b-phenyl-5H-imidazo[2,1-a]isoindol-5-one are added in portions to a stirred suspension of 10 g. of lithium aluminum hydride in one liter of hydrous tetrahydrofuran. The mixture is stirred at reflux temperatures for eighteen hours, then the remaining lithium aluminum hydride is decomposed by cautious dropwise addition of water. The solids are separated by filtration and then extracted with boiling ethyl acetate (2.0–2.5 liters total). The ethyl acetate extract is evaporated in vacuo until solid begins to precipitate. The mixture is chilled and the solid is separated by filtration. After drying, there is obtained a white crystalline solid which is 2,3,5,9b-tetrahydro-9b-phenyl-1H-imidazo[2,1-a]isoindol-5-ol, M.P. 105–7° C. (dec.).

Analysis (I)—Infrared absorption (KBr) at 3225 cm.$^{-1}$;

(II)—Ultraviolet absorption (95% ETOH) 245 m$\mu$ ($\epsilon$=5,800), 279 m$\mu$ ($\epsilon$=1,520) which is essentially that of the hereinafter described 2-(2-aminoethyl)-3-phenylphthalimidine; and (III) Calcd. for $C_{16}H_{16}N_2O$ (percent): C, 76.16; H, 6.39; N, 11.10. Found (percent): C, 75.86; H, 6.29; N, 10.93.

EXAMPLE VI

Repeating the procedure of Example II, 2,3,5,9b-tetrahydro-9b-phenyl-1H-imidazo[2,1-a]isoindol-5-ol is converted to 2-(2-aminoethyl)-3-phenylphthalimidine hydrochloride, as a white crystalline solid, M.P. 262° C. (dec.)

Analysis.—Infrared absorption (KBr) at 1685 cm.$^{-1}$.

EXAMPLE VII

When the procedure of Example III is repeated employing 2,3,5,9b-tetrahydro-9b-phenyl-1H-imidazo[2,1-a]isoindol-5-ol, there is obtained 2-(2-aminoethyl)-3-phenylphthalimidine, as a white crystalline solid, M.P. 83–5° C.

Analysis (I)—Infrared absorption (KBr) at 1675 cm.$^{-1}$;
(II)—Ultraviolet absorption (95% ETOH) 245 m$\mu$ ($\epsilon$=5,900), 279 m$\mu$ ($\epsilon$=1,700); and (III)—Nuclear magnetic resonance spectrum in deuterated chloroform (CDCl$_3$) for:

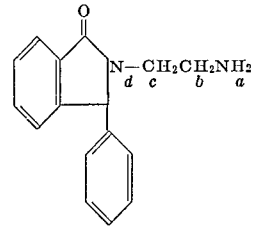

[1] 1.2 p.p.m. (singlet, 2 protons which disappears on deuteration at $a$).
[2] 2.6–41 p.p.m. (2 multiplets, 4 protons, at $b$ and $c$),
[3] 5.5 p.p.m. (singlet, 1 proton, at $d$), and
[4] 6.9–7.9 (multiplet, 9 aromatic protons).

EXAMPLE VIII

Six grams of the above-prepared 2-(2-aminoethyl)-3-phenylphthalimidine are added to a stirred suspension of 6 g. of lithium aluminum hydride in 250 ml. of anhydrous ether. The mixture is stirred and refluxed for fifteen hours. The mixture is decomposed by the careful addition of water. The ether layer is separated, dried over magnesium sulfate and evaporated to dryness. The residue is dissolved in absolute ethanol and saturated with hydrogen chloride. The solid is separated and recrystallized from alcohol. On drying there is obtained 2-(2-aminoethyl)-1-phenylisoindoline dihydrochloride, M.P. 215–8° C. (dec.).

What is claimed is:

1. A compound selected from the group consisting of those having the formula:

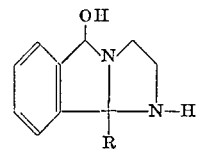

wherein R is selected from the group consisting of phenyl and chlorophenyl.

2. 9b - (p - chlorophenyl) - 2,3,5,9b - tetrahydro - 1H-imidazo[2,1-a]isoindol-5-ol.

3. 2,3,5,9b - tetrahydro - 9b-phenyl-1H-imidazo[2,1-a]isoindol-5-ol.

References Cited

UNITED STATES PATENTS 3,445,476    5/1969    Sulkowski et al. _____ 260—325

HENRY R. JILES, Primary Examiner

G. T. TODD, Assistant Examiner

U.S. Cl. X.R.

260—326.1; 424—274